United States Patent

Obenhaus

[15] 3,702,418
[45] Nov. 7, 1972

[54] PROTECTION SYSTEM WITH MANUAL RESET MEANS OPERABLE ONLY ON CLEARING OF THE FAULT

[72] Inventor: Robert E. Obenhaus, South Easton, Mass.

[73] Assignee: Texas Instruments Incorporated, Dallas, Tex.

[22] Filed: Sept. 30, 1971

[21] Appl. No.: 185,103

[52] U.S. Cl. ............... 317/13 A, 317/13 C, 317/23, 317/33 R, 317/41, 317/52, 317/54
[51] Int. Cl. ............................................. H02h 5/04
[58] Field of Search ..317/54, 60, 52, 41, 13 A, 13 C, 317/36 TD, 23, 33 R, 18 D

[56] References Cited

UNITED STATES PATENTS

| | | | |
|---|---|---|---|
| 3,416,060 | 12/1968 | Evalds | 317/41 |
| 3,526,809 | 9/1970 | Obenhaus | 317/41 |
| 3,407,337 | 10/1968 | Benham | 317/18 D |

*Primary Examiner*—J. D. Miller
*Assistant Examiner*—Harvey Fendelman
*Attorney*—Harold Levine et al.

[57] ABSTRACT

A protection system is provided for effecting disruption of the power being supplied to a load responsive to a sensed variation in the operation of a system being protected and for preventing re-application of power to the load until the fault dissipates. The system includes a first selectively operable switch means for connecting and disconnecting the load from a source of power and a switch control means operatively connected to the switch means for effecting opening and closing thereof so as to effect removal and re-application of power to the load, respectively responsive to energization and de-energization thereof. The switch control means remains in an energized condition subsequent to energization due to the establishment of a magnetic bias until neutralization of the magnetic bias is effected. A selectively energizable current switch is coupled to the switch control means for controlling its operation, while means responsive to the operation of the system being protected are coupled to the current switch for controlling conduction thereof responsive to predetermined variations in the operation of the system being protected. In addition, selectively operable means are coupled to the switch control means for effecting neutralization of the magnetic bias only when the current switch returns to a non-conductive condition.

16 Claims, 1 Drawing Figure

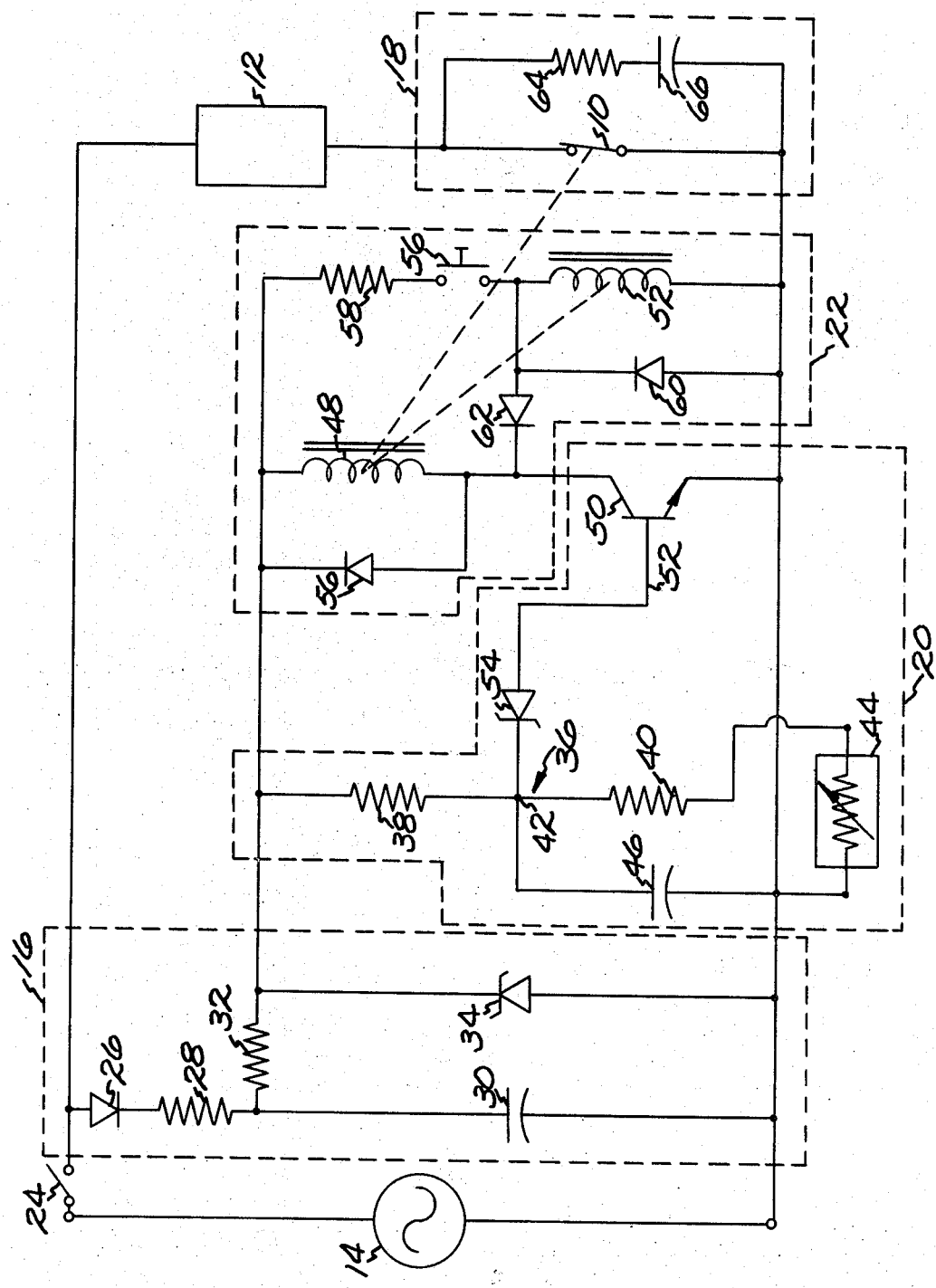

3,702,418

PROTECTION SYSTEM WITH MANUAL RESET MEANS OPERABLE ONLY ON CLEARING OF THE FAULT

The present invention relates generally to protection systems and more particularly is directed to an improved electronic protection system for effecting disruption of the power to a load in the presence of a sensed fault in the operation of the system being protected and for maintaining such a condition.

A wide variety of electronic protection systems are currently available for sensing operation of a system and disrupting the power being supplied thereto in the event of a sensed fault condition such as over-current, over-heating, etc. Generally such protection systems are designed to operate in an automatic fashion to effect opening of a main power switch, or the like, so as to cause the applied power to be disconnected from the load in the event of a sensed fault condition. However, it is generally necessary that means be provided for effecting re-application of power to the load after such a power disruption has been effected. This is usually accomplished by providing suitable reset switch means or re-cycling the power input to the load. For example, in such systems a manual reset switch may be provided for re-closing the main power switch to permit power to be reapplied to the load. However, such protection systems may be quite dangerous in certain instances. For example, the fault condition may remain in existence, while actuation of the manual reset switch may permit power to be reapplied to the load, thereby overriding the protection system, even if only temporarily, which may result in damage to the system being protected. Similarly, in certain instances, resetting of the system may be effected prior to disconnecting the main power source from the system thereby permitting a potentially dangerous situation to occur with respect to personnel working on the system. Furthermore, some systems may be re-actuated upon the re-application of power to the load externally so as to effect automatic operation of the reset switch, which also may lead to potentially dangerous situations. It is thus extremely advantageous to provide a system which effects complete power disruption and maintains this condition even when manual reset is attempted unless the fault condition has dissipated. Such a system may be said to have a memory function in that it maintains a particular state, i.e., a state of deenergization, until proper conditions for the re-application of power have been established. It is furthermore desirable to provide such a system in which the continued presence of a fault condition prevents continued cycles of re-application and disruption of power to the load.

Accordingly, it is an object of the present invention to provide an improved protection system in which positive disruption of the power being supplied to a load is effected and maintained responsive to a sensed fault condition.

It is a further object of the present invention to provide an improved protection system in which the power being supplied to a load is disrupted and prevented from being reapplied to the load until positive dissipation of the fault condition has occurred.

Various additional objects and advantages of the present invention will become readily apparent from the following detailed description and accompanying drawing wherein:

The sole drawing is a schematic circuit diagram of a preferred embodiment of the present invention.

Referring generally to the drawing, a protection system in accordance with the present invention generally includes a first selectively operable switch means 10 which is normally closed for supplying power to the load 12 from a suitable power source 14. More particularly, the system includes a power supply network 16 for supplying power from the power source 14 to an output network 18, including the switch 10, which is serially connected to the load 12 for controlling the supply of power thereto. In addition, a fault sensing network 20 is provided which is responsive to sensed variations in the operation of the system being protected, such as a system (not shown) coupled to the load 12. The fault sensing network in turn is coupled to a control network 22 which controls the selectively operable switch 10, responsive to the sensed variations.

More specifically, the power source 14 preferably comprises a suitable a.c. power source such as a conventional 115 volt, 60 hz power source which is connected to the power supply system 16 through a suitable main power switch 24 which upon closure effects application of power to the system. In this regard, upon application of power to the system it may be seen that power is directly supplied to the load 12 from the power source 14 since the selectively operable switch 10 is in a normally closed condition in the absence of a sensed fault causing opening thereof. Power for energizing the fault sensing network 20 and the control network 22 is provided by the power supply network 16, which, as shown, includes a rectifier diode 26, serially connected to a current limiting resistor 28 and to a filter capacitor 30 to define a half-wave unregulated d.c. power source connected across the a.c. power source 14. In order to provide a more stable source of operating power for the fault sensing network 20 and the control network 22 a coupling resistor 32 is connected intermediate the resistor 28 and the capacitor 30 while a voltage regulator device, such as a zener diode 34, is connected across the resistor 32 and capacitor 30 to provide a regulated d.c. voltage source which supplies regulated d.c. power to the fault sensing network 20 and the control network 22, thereby stabilizing circuit operations substantially independently of variations in line voltage due to transients, or the like.

Fault sensing, i.e., sensing improper operation of the system being protected, is accomplished by the fault sensing network 20 which may be arranged to sense various types of undesired operation, such as overheating, over-current, etc. The fault sensing function is preferably accomplished by means of a voltage divider configuration 36 which includes first and second resistors 38 and 40 with a junction 42 therebetween, while a variable impedance sensor 44 is connected to one of the resistors of the voltage divider, and in the illustrated embodiment is connected to the resistor 40. The variable impedance sensor 44 may comprise any one of a variety of variable impedance elements, and preferably comprises a thermistor which varies in resistance in response to temperature. Accordingly, the sensor 44 may be arranged thermally coupled to but electrically isolated from the system being protected. For example, the sensor 44 may be suitably thermally coupled to a heat responsive resistor (not shown) in the system being protected such that excessive current flow through the heat responsive resistor could cause the temperature of the sensing element 44 to similarly increase with a consequent variation in its resistance so as to effect a variation in the voltage level established at the voltage divider junction 42 which, in turn, causes the fault sensing network 20 to effect operation of the switch means 10. Similarly, the variable impedance sensor 44 could comprise a photo-resistor, a photo-cell, etc., which could be optically coupled to the system being protected for sensing undesired variations in the operation thereof. However, in the illustrated embodiment the variable impedance sensing element 44 preferably comprises a thermistor having a positive temperature coefficient of resistance which is adapted to be thermally coupled to a heating resistor, or the like, in the system being protected for sensing undesired over-current operation thereof so as to effect opening of the switch means 10, thereby disrupting the power being applied to the load which also may be suitably coupled to the system being protected for effecting deenergization thereof. In addition, a voltage integrating capacitor 46 is connected across the resistor 40 of the voltage divider 36 in order to prevent the occurrence of transients or spurious signals from inadvertently effecting operation of the fault sensing network. Thus, when the voltage divider configuration 36 which is connected across the zener diode 34, is supplied with power of first preselected voltage level is established at the junction 42, when the variable impedance sensor 44 is not exposed to improper operation of the system being protected. However, when improper operation of the system being protected occurs the impedance of the sensor 44 varies and accordingly the voltage developed across the leg of the voltage divider 36 including the resistor 40 varies so that a second preselected voltage level is established at the junction 42 as an indication of undesired operation of the system being protected. This second preselected voltage level may, in turn, be utilized for effecting opening of the selectively operable switch 10, as will now be explained in detail.

The establishment of the second preselected voltage level at the junction 42 effects energization of a first selectively energizable switch control means 48, which is operatively connected to the switch 10 and adapted to effect opening of the switch 10 in response to energization of the switch control means 48. Furthermore, in accordance with an important feature of the present invention, once energized the switch control means 48 retains the switch 10 in an open condition due to the establishment of a magnetic bias, as will be explained hereinafter, until neutralization of the magnetic bias is effected subsequent to dissipation of the sensed fault condition. Energization of the first selectively energizable switch control means 48 is accomplished responsive to conduction of a selectively energizable current switch 50 which is coupled thereto, the conduction of the current switch 50 being controlled responsive to the voltage level established at the junction 42. Similarly, reverse action is accomplished by a selectively operable means 52 which is also coupled to the current switch 50 and may be energized only when the current switch 50 is in a non-conductive condition. More particularly, the current switch 50 includes a control element 52 which is coupled to the junction 42 through a suitable constant threshold establishing device 54. Preferably, the threshold establishing device 54 comprises a zener diode which functions to compensate for differences in electrical characteristics when different switch devices are utilized. The current switch 50 may comprise any one of a variety of current switch devices and in the illustrated embodiment is shown as a transistor having its base connected to the junction 42 through the zener diode 54. The transistor 50 is illustrated as an NPN transistor although, if desired, the circuit may be suitably modified to employ a PNP transistor. The collector-emitter circuit of the transistor 50 is coupled to the first selectively energizable switch control means 48 which preferably comprises a relay latch coil adapted to effect opening of switch 10 responsive to current flow therethrough, and to retain switch 10 open. Accordingly, when the transistor 50 is rendered conductive, the coil 48 which is serially connected to the collector-emitter circuit thereof is energized. Furthermore, since latch coil 48 is operatively connected to the switch 10, energization of the latch coil effects opening of the switch. In addition, a diode 56 is connected across the latch coil 48 so as to provide transient protection for the coil in order to prevent inadvertent energization thereof due to spurious or transient signals. Thus, in operation, when the transistor 50 is rendered conductive responsive to a variation in the impedance of the sensor 44, the latch coil 48 is energized to effect opening of the switch 10, thereby disrupting power to the load 12. Furthermore, in accordance with an important feature of the present invention the switch 10, the latch coil 48 and the means 52 which comprises an unlatch coil, preferably define a reed relay. Thus subsequent to energization of the latch coil 48, the switch 10 is magnetically latched in its open position, i.e., the system has a memory function, whereby the switch 10 remains in an open condition even if current flow through the coil 48 is halted until positive action is taken to temporarily neutralize the magnetic bias of the permanent magnet (not shown) of the reed relay to permit the switch 10 to return to its closed condition. Furthermore, this neutralization may be only accomplished if the fault condition has dissipated and the impedance of the sensor 44 has returned to a level indicative of proper operation of the system being protected.

In order to effect removal of the previously established magnetic bias and permit the switch 10 to return to its closed position the unlatched coil 52 is connected in shunt with the latch coil 48 and is selectively coupled to the power supply network 16 through a normally open reset switch 56 and through a current limiting resistor 58. The reset switch 56 may comprise a manually actuatable push-button switch adapted to momentarily connect the power supply 16 to the unlatch coil 52 so as to permit current to flow therethrough. In this connection the unlatch coil 52 is coupled to the latch coil 48 and upon energization thereof a magnetic field is established across the unlatch coil 52 of an opposite direction to the magnetic field established across the latch coil 48 such that energization of the unlatch coil causes neutralization of any previous magnetic bias, thereby permitting the switch 10 operatively connected to the latch coil 48 to return to its closed position. In addition, a diode 60 is connected across the unlatch coil 52 in order to assure transient free operation thereof. However, the unlatch coil 52 is connected across the collector-emitter circuit of the transistor 50 and the junction between the reset switch 56 and the unlatch coil 52 is coupled to the collector of transistor 50 through a suitable unidirectional switch means 62 which in the illustrated embodiment comprises a diode having its anode connected to this junction and its cathode connected to the collector of transistor 50. The diode 62 functions to maintain the unlatch coil 52 electrically isolated from the transistor 50 when the transistor 50 is in a non-conductive condition and also functions to shunt current away from the unlatch coil 52 when the transistor 50 is in a conductive condition so that closure of the reset switch 56 is ineffective to cause neutralization of the magnetic bias, when the transistor 50 is in a conductive condition. More particularly, it may be seen that when the transistor 50 is conductive the diode 62 is forward biased so that current cannot flow to the unlatch coil 52, thereby preventing energization of the unlatch coil 52. Thus, if the reset switch 56 is depressed, while the transistor 50 is in a conductive condition responsive to a sensed fault condition the diode 62 is forward biased and current cannot flow through the coil 52, but instead is shunted away from the coil 52 through the forward diased diode 62 and through the collector-emitter circuit of the transistor 50. Similarly, the diode 62 functions to block any current flow through the latch coil 48 to the unlatch coil 52. Similarly, when the transistor 50 is non-conductive the diode 62 is reverse biased and thus blocks current flow therethrough so that upon closure of the reset switch 56 current is positively shunted away from the coil 48 which is hence prevented from being energize and instead current is caused to flow through the unlatch coil 52 so that neutralization of the magnetic bias is effected. Thus, it may be seen that the provision of the diode 62 prevents energization of the unlatch coil 52 until the fault condition is removed permitting the transistor 50 to become non-conductive so that the diode 62 becomes reverse biased. Accordingly, it may be seen that once a fault condition has been sensed causing conduction of transistor 50 and consequent energization of the latch coil 48, energization of the unlatch coil 52 to effect neutralization of the magnetic bias and reclosing of the switch 10 cannot be effected until the fault condition has dissipated and the impedance of the sensor 44 has returned to its proper level so that transistor 50 becomes non-conductive, whereby closing of the reset switch 56 is effective to permit energization of the unlatch coil 52. In addition, in order to minimize contact errosion and sparking a suitable voltage suppression system, such as a serially connected resistor 64 and capacitor 66 is connected across the switch 10.

Thus, a unique protection system has been provided and described in detail hereinabove in which the power being supplied to a load is disrupted responsive to a sensed fault condition and the power is prevented from being reapplied to the load until dissipation of the sensed fault has occurred.

Various changes and modifications in the above-described embodiment will be readily apparent to those skilled in the art and any of such changes or modifications are deemed to be within the spirit and scope of the present invention as set forth in the appended claims.

I claim:

1. A protection system for effecting disruption of the power being supplied to a load responsive to a sensed variation in the operation of a system being protected comprising;

a first selectively operable switch means for connecting and disconnecting the load from a source of power in response to closing and opening thereof, a first selectively energizable switch control means operatively connected to said first switch means adapted to effect opening of said first switch means responsive to energization thereof, said first switch means maintained in its open condition until a neutralizing operation is effected, a selectively energizable current switch coupled to said switch control means, said current switch effecting energization of said switch control means responsive to conduction thereof, means responsive to the operation of the system being protected for rendering said current switch conductive responsive to a preselected variation in the operation of the system being protected, and selectively operable neutralizing means coupled to said current switch and to said switch control means for effecting said neutralizing operation only when said current switch returns to a non-conductive condition.

2. A protection system in accordance with claim 1 wherein said means responsive to the operation of the system being protected comprises a variable impedance, the impedance of which varies responsive to variations in the operation of the system being protected.

3. A protection system in accordance with claim 2 wherein said means responsive to the operation of the system being protected includes a voltage divider having a pair of legs defining a junction, one of said legs being connected to said variable impedance, whereby first and second preselected voltage levels are established at said junction responsive to first and second impedance values of said variable impedance corresponding to desired and undesired operation respectively of the system being protected.

4. A system in accordance with claim 3 wherein said current switch is coupled to said voltage divider junction and is adapted to be rendered conductive responsive to establishment of said second preselected voltage level at said junction, thereby energizing said switch control means.

5. A system in accordance with claim 4 wherein said current switch comprises a transistor having its base coupled to said voltage divider junction and having its collector-emitter circuit serially coupled to said switch control means, said collector-emitter circuit defining a low impedance current path upon conduction of said transistor while substantially precluding current flow therethrough upon non-conduction of said transistor.

6. A system in accordance with claim 4 wherein said switch control includes a first relay coil coupled to said current switch, said first relay coil being energized responsive to current flow through said current switch for rendering said first switch means non-conductive upon the initiation of current flow through said first relay coil causing magnetic retention of said first switch means in a non-conductive condition.

7. A system in accordance with claim 6 wherein said neutralizing means includes a second selectively energizable relay coil adapted to selectively neutralize the magnetic retention of said first switch means in a non-conductive condition responsive to current flow through said second relay coil.

8. A system in accordance with claim 7 wherein said first relay coil comprises a latch coil serially connected to said current switch, said latch coil effecting opening and retaining in an open condition of said first switch means until current flow is established through said second relay coil.

9. A system in accordance with claim 8 wherein said second relay coil comprises an unlatch coil connected in shunt relationship with said latch coil.

10. A system in accordance with claim 9 wherein means are provided for electrically isolating said unlatch coil from the source of power to prevent current flow therethrough when said current switch is in a conductive state.

11. A system in accordance with claim 10 wherein said means for electrically isolating said unlatch coil from the source of power comprises a unidirectional switch connected between said unlatch coil and said current switch, said unidirectional switch being rendered conductive for shunting current flow from said unlatch coil through said current switch when said current switch is in a conductive state.

12. A system in accordance with claim 11 wherein said unidirectional switch comprises a diode.

13. A system in accordance with claim 11 wherein a selectively operable reset switch is coupled between the source of power and said unlatch coil for effecting current flow through said unlatch coil upon closure thereof only when said current switch remains in a non-conductive condition.

14. A protection system for disrupting the power to a load responsive to a sensed fault condition and precluding the re-application of power to the load prior to dissipation of the fault condition comprising;

a first normally closed switch means for connecting the source of power to the load, a relay including a latch coil operatively connected to the switch means for effecting opening thereof upon energization of said latch coil, said latch coil permitting a magnetic bias to effect retention of said switch means in an open condition subsequent to de-energization thereof, and an unlatch coil for effecting neutralization of the magnetic bias upon energization of said unlatch coil, a normally non-conductive semi-conductor switch device having a voltage responsive control element for controlling conduction thereof serially connected to said latch coil and connected in shunt across said unlatch coil for effecting energization of said latch coil and preventing energization of said unlatch coil upon conduction thereof, sensing means coupled to said control element for controlling conduction of said semi-conductor switch, said sensing means including a variable impedance coupled to the power source whereby a variation in its impedance responsive to a sensed fault condition varies the voltage established thereacross so as to render said semi-conductor switch device conductive, a selectively operable reset switch coupled between the power source and said unlatch coil for effecting energization thereof upon closure of said reset switch, said reset switch being connected in shunt with said latch coil for positively shunting current from said latch coil only when said semi-conductor current switch device is rendered non-conductive upon dissipation of the fault condition, and shunt switch means coupled between said unlatch coil and said reset switch, said shunt switch means being rendered conductive responsive to conduction of said semi-conductor switch for shunting current away from said unlatch coil until said semi-conductor switch is rendered non-conductive whereupon current flow through said unlatch coil is permitted.

15. A system in accordance with claim 14 wherein said shunt switch means comprises a diode having one terminal connected intermediate said reset switch and said unlatch coil and its other terminal coupled to said semi-conductor switch.

16. A system in accordance with claim 15 wherein said semi-conductor switch comprises a transistor having its base coupled to said sensing means and its collector-emitter circuit serially connected to said latch coil and in shunt across said unlatch coil.

* * * * *